United States Patent

[11] 3,621,124

[72] Inventor Sing Liong Tan
Emmasingel, Eindhoven, Netherlands
[21] Appl. No. 796,987
[22] Filed Feb. 6, 1969
[45] Patented Nov. 16, 1971
[73] Assignee U.S. Philips Corporation
New York, N.Y.
[32] Priority Feb. 8, 1968
[33] Netherlands
[31] 6801742

[54] TELEVISION CAMERA
7 Claims, 2 Drawing Figs.

[52] U.S. Cl. ..................................... 178/5.4 TC, 178/71 AC
[51] Int. Cl. ..................................... H04n 9/08
[50] Field of Search ..................................... 178/5.4 TC, 7.1 AC, 5.4

[56] References Cited

UNITED STATES PATENTS

| | | | |
|---|---|---|---|
| 2,971,053 | 2/1961 | Gibson | 178/7.1 AC |
| 2,989,587 | 6/1961 | Bedford | 178/7.1 AC |
| 3,281,528 | 10/1966 | James | 178/5.4 |

*Primary Examiner*—Robert L. Griffin
*Assistant Examiner*—Richard P. Lange
*Attorney*—Frank R. Trifari

ABSTRACT: A camera circuit features at least two camera tubes, one of which has a larger effective target plate capacitance, hence produces a higher resolution signal, than the other tube. The high-resolution signal is applied to an aperture correction circuit and then to the low-resolution signal to correct for the "comet tail" effect. To obtain the high-target plate capacitance effect, the target plate can be made larger, or the lower resolution tubes can have bundles of optical fibers in front of them.

Figure 1:
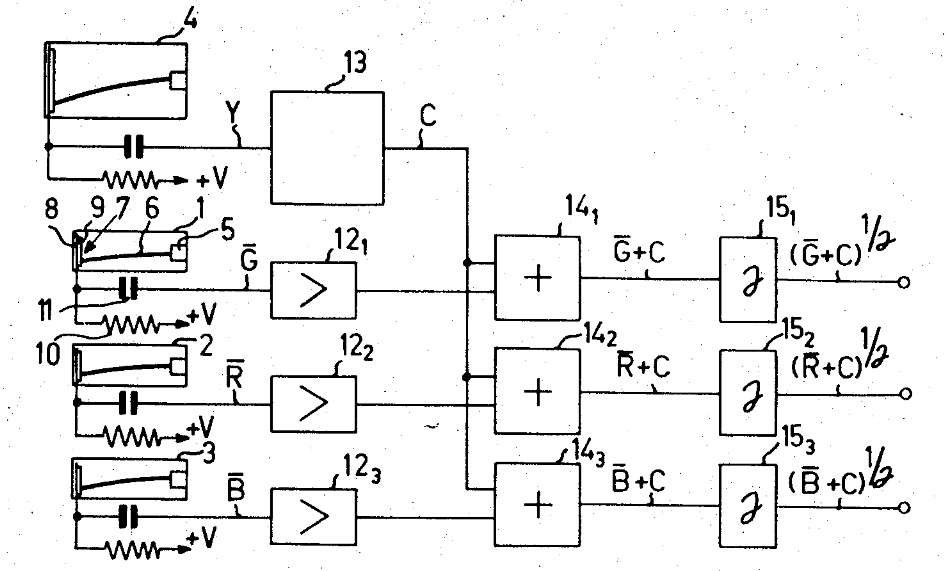

INVENTOR.
SING LIONG TAN
BY
[signature]
AGENT

TELEVISION CAMERA

The invention relates to a television camera including at least two camera tubes which are each provided with a target plate having a potential image corresponding to a scene to be picked up which potential image is converted into a picture signal with the aid of an electron beam produced by an electron gun and scanning the target plate, the effective capacitance formed by the target plate in one camera tube and discharged by the electron beam being large relative to that of the other camera tube.

The radiation such as, for example, light coming from a scene to be pickup up is converted into an electrical picture signal by means of a television camera. This picture signal is applied as a component of a video signal for example to a display tube of a television receiver and produces a picture representing the scene on the display screen thereof. The picture on the screen must satisfactorily produce the details of the scene and show changes of or variations in the scene without distortion.

However, in practice it has been found that the picture of a scene which has optimum satisfactory details, is unsharp in the form of a persistent trail behind moving parts in the scene, and show a persistent picture in case of variations in the scene. This is caused by the phenomenon that a change of or variation in the scene is completely taken over by the picture signal derived from the potential image on the target plate only after a certain delay time. Particularly in color television in which the distortions are accompanied by a discoloration of the picture, these distortions become clearly manifest. It is known that the said distortions can be reduced by making the picture of a static scene less rich in detail. It is evident that the solution which emanates from this proposed compromise is far from being correct. This becomes particularly manifest in, for example, monochrome X-ray television in which quickly changing phenomena must satisfactorily be observed in detail.

In color television camera having, inter alia, four camera tubes is known from British Patent specification No. 1,051,065. It is stated therein that the surface of the target plate of one of the four camera tubes is larger than those of the other three. This one camera tube produces a picture signal corresponding to the brightness of the light coming from the scene. The other three camera tubes produce picture signals which represent the color components in the light coming from the scene. The television camera is provided with an optical system so that the potential image on the large target plate of one camera tube is richer in detail than that on the small target plates of the other camera tubes. According to the said patent specification a combination of the four picture signals and the transmission of the combination when being displayed would result in a sharp picture without persistent effects. As has been mentioned in the foregoing the result will, however be that a compromise is reached whereby the distortions in the form of persistent effects due to causing less discoloration become manifest in the picture only to a smaller extent.

It is an object of the invention to provide a television camera which produces a picture signal which does not show distortions in a picture rich in detail, for example, when being displayed on the screen of a display tube. To this end the television camera according to the invention is characterized in that the picture signal produced by the tube having the large effective capacitance of the target plate is only applied to means for deriving a correction signal for aperture correction from this picture signal, which correction signal and at least part of the picture signal produced by a further camera tube having the small effective capacitance of the target plate are applied to a superposition stage the supplied superposition picture signal from which represents at least part of the scene picked up by the camera. According to the invention, a television camera which is suitable for color television in which the effective capacitance of the target plates of three out of the four camera tubes included in the camera is small relative to that of the fourth camera tube, the latter producing a picture signal corresponding to the brightness of the light coming from the scene is characterized in that the fourth camera tube applies the produced picture signal to the means for aperture correction only, while the picture signals produced by the three camera tubes having the small effective capacitance of the target plates are each applied at least in part to a superposition stage, the correction signal provided by the said means being applied to each of the three superposition stages.

The invention is based on the recognition of the fact that an undistorted picture which is rich in detail can be obtained under all circumstances by using, together with means for aperture correction, at least two camera tubes each having a different function. One camera tube has an unsharp potential image on the target plate which image is poor in detail and hence follows all changes of and variations in the scene satisfactorily. The other camera tube has, however, a sharp potential image on the target plate which is rich in detail and in which as already stated changes of or variations in the scene are accompanied by a distortion in the represented scene in the shape of a persistent trail or picture. By using only the picture signal produced by the last-mentioned camera tube so as to derive therefrom a correction signal for aperture correction, the result is that, due to the comparative character in deriving the correction signal, the said distortions become very little manifest therein. After superposition of the correction signal on the picture signal of the first-mentioned camera tube corresponding to an unsharp picture, a superposition picture signal is obtained which produces a sharp picture when displayed on a screen.

Figure 2:
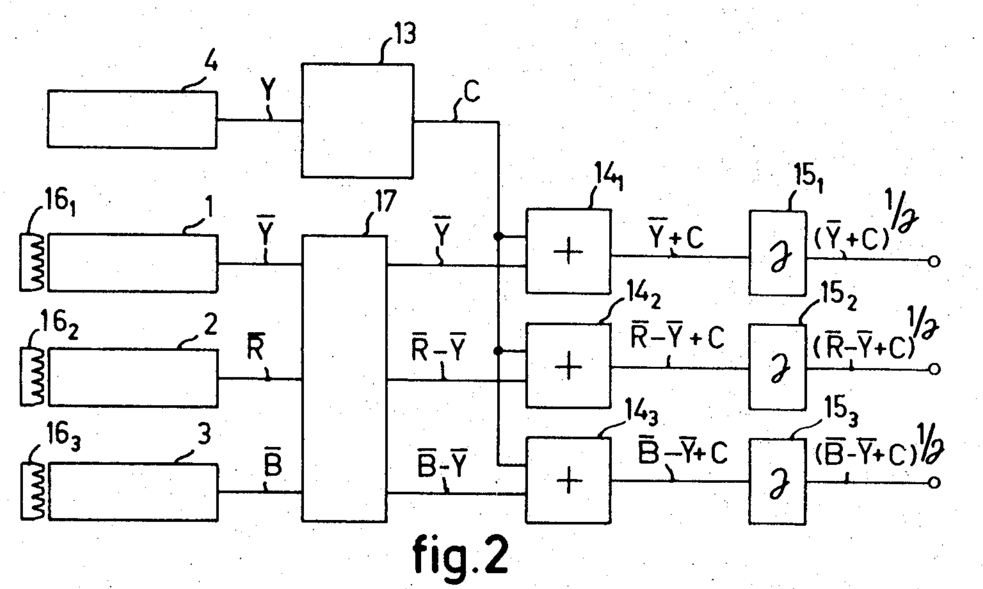

In order that the invention may be readily carried into effect it will now be described in detail, by way of example, with reference to the accompanying diagrammatic drawing, in which:

FIG. 1 shows a color television camera according to the invention of the YGRB type and FIG. 2 shows a further color television camera according to the invention.

FIG. 1 shows three camera tubes 1, 2, 3 of a television camera suitable for color television for producing respective picture signals $\bar{G}$, $\bar{R}$ and $\bar{B}$ and a fourth camera tube 4 for producing a picture signal Y. The picture signals $\bar{G}$, $\bar{R}$ and $\bar{B}$ represent the green, red and blue light, respectively, occurring in the scene to be picked up and will be indicated as color signals in this description. The picture signal Y is in a certain algebraic ratio to the said color signals and is generally indicated by the brightness signal Y. It applies generally that $Y=0.30R+0.59G+0.11B$. The dashes bove the color signals $\bar{G}$, $\bar{R}$ and $\bar{B}$ in FIG. 1 serve to show that the maximum frequency occurring in the color signals relative to the brightness signal Y is smaller than that in the brightness signal Y.

It is not shown in the television camera in what manner the light coming from a scene to be picked up is distributed over the various camera tubes 1 to 4, since this is irrelevant for the invention. To clarify the principle of the invention a few components of the camera tubes 1 to 4 are shown in greater detail as far as is necessary, while for the description thereof camera tube 1 will be described further. In camera tube 1 a cross section of which is diagrammatically shown, an electron beam 6 produced by electron gun 5 scans a target plate 7 in known manner according to line and frame with the aid of acceleration, focusing and deflection means not shown. Target plate 7 consists of a transparant signal plate 8 conducting an electric current, a photosemiconductor layer 9 being provided on the side of the signal plate facing the electron gun 5. The green light coming from a scene to be picked up is projected through the signal plate 8 onto photosemiconductor layer 9 with the aid of a projection system not shown. Signal plate 8 is connected through a resistor 10 to a terminal conveying a positive potential +V and through an isolation capacitor 11 to an amplifier $\mathbf{12_1}$. The color signal $\bar{G}$ representing the green light of the scene is applied in this manner to amplifier $\mathbf{12_1}$. The construction of amplifier $\mathbf{12_1}$ may be as simple as possible, but may alternatively comprise delay lines, filters, etc. The same applies to amplifiers $12_2$ and $12_3$ to which the signals $\bar{R}$ and $\bar{B}$ are applied by the camera tubes 2 and 3, respectively.

The color signal $\bar{G}$ is obtained with the aid of camera tube 1 as follows: of target plate 7, signal plate 8 and the side of the photosemiconductor layer 9 facing the electron gun 5 constitute, as it were, the terminals of a capacitor. The positive potential +V is impressed on signal plate 8 through resistor 10. Photosemiconductor layer 9 forms a leakage resistor for the said capacitor so that a positive charge flows to the side facing the electron gun 5, dependent on the local resistivity of layer 9. Thus a capacitor is obtained which is formed from many partial capacitors. Signal plate 8 forms a capacitor plate made in one piece, while the side of semiconductor layer 9 facing the electron gun 5 constitutes, as it were, many capacitor plates in a mosaic form which are more or less isolated from one another. During scanning, electron beam 6 serves as a switch for the successive switching of the partial capacitor each of which conveys a voltage as a function of their local leakage resistivity. If electron beam 6 which scans target plate 7 according to line and frame returns to the same spot after a picture period, that is to say, upon interlacing after two frame periods, the potential on the semiconductor layer 9 is locally adjusted to substantially cathode potentials of the electron gun 5. The charge neutralized on layer 9 with the aid of electron beam 6 is simultaneously applied to signal plate 8 through resistor 10 from the terminal conveying the positive potential +V , the resultant current pulse producing an instantaneous voltage drop across resistor 10. By directing the green light of the scene to be picked up for camera tube 1 through the transparent conducting signal plate 8 onto the photosemiconductor layer 9 the leakage resistivity thereof changes locally as a function of the scene projected so that the side of the layer 9 facing the electron gun 5 shows a potential image which corresponds to the scene. In this manner the scene to be picked up is converted according to line and frame by means of the electron beam 6 into a color signal G applied to amplifier $12_1$. The signals $\bar{R}$, $\bar{B}$ and $\bar{Y}$ are produced in a similar manner by the camera tubes 2, 3 and 4, respectively.

With regard to the requirements which can generally be imposed on a picture signal it applies inter alia that the resulting picture shows sufficient details when the picture signal is displayed on the screen of a display tube. It follows from the foregoing that the details in the picture are determined by the extent to which the details of the scene in the potential image occur on the side of the photosemiconductor layer 9 facing the electron gun 5 of the target plate 7 and the extent to which these are converted into the picture signal with the aid of the electron beam 6.

The influence of the electron beam 6 on a picture signal is determined by the cross section thereof, since a smaller cross section has a greater resolving power upon scanning the potential image on the target plate 7. The cross section of the beam 6 cannot, however, be made arbitrarily small since on the one hand beam 6 determines the maximum negative charge transport for neutralizing the positive charge on the target plate 7 and on the other hand is bounded by the mutual repulsion of the electrons in beam 6.

Starting from an electron beam 6 having an optimum current intensity and cross section it will be evident that unless additional steps are taken the picture produced on a display screen by a picture signal cannot be more detailed than the potential image on the target plate 7 itself. To increase the details of the potential image relative to the optimum cross section of the beam it is simple to enlarge the surface of the target plate scanned by the beam 6 and on which the scene is projected. It is alternatively possible to reduce the thickness of the semiconductor layer 9 so that, due to the shorter path in the layer 9 which must be covered by the positive charge for forming the potential image on target plate 7, there is less mutual influence on the potentials of the said capacitor plates in mosaic form, which are regarded to be more or less isolated from one another. Both steps, however, give rise to an increase of the overall effective capacitance of the target plate between signal plate 8 and the side of the semiconductor layer 9 facing the electron gun 5. As already described hereinbefore, for obtaining a correct picture signal representing the scene each capacitor plate of the said mosaic must be adjusted to the cathode potential of the gun 5 within the short period of being struck by the electron beam 6, and the overall effective capacitance of the target plate must be discharged within one picture period or two frame periods. If the first condition is not satisfied the nonneutralized residual charge on the capacitor plate will still occur one picture period later in the picture signal after the striking point of beam 6 has been passed. When displaying the scene with a bright part moving therein the result is that a persistent trail in the form of a so-called comet tail appears behind the moving part. If the second condition is not satisfied a persistent picture of the old scene will occur upon display of a change of the scene; a period of a few tenths of a second is then possible.

It appears from the foregoing that when displaying a picture signal produced by an arbitrary camera tube, a compromise must be settled between a sharp picture showing many details on the one hand and a picture in which changes of or variations in the scene occur without interference or distortion on the other hand. For a color television camera having a plurality of camera tubes this compromise is more difficult to settle, while the said distortions in a picture appear as color errors on a display screen.

In the YGRB-color television camera of FIG. 1 the said compromise is obviated by a step according to the invention in which the brightness signal Y produced by camera tube 4 is not combined in the known direct manner with the color signals $\bar{G}$, $\bar{R}$ and $\bar{B}$ of the camera tubes 1, 2 and 3, respectively, but is applied only to means 13 for deriving a correction signal C for aperture correction from the signal Y.

In FIG. 1 camera tube 4 is shown having a larger target plate surface relative to camera tubes 1, 2 and 3, which surface is scanned by electron beam 6 having an optimum cross section. As has already been described the result is that the brightness signal Y would show more details in case of a display on the screen of a display tube than the signals $\bar{G}$, $\bar{R}$ and $\bar{B}$. A picture of greater detail corresponds to a higher maximum frequency in the relevant picture signal; as has already been described the said frequency difference between the brightness signal Y and the color signals $\bar{G}$, $\bar{R}$ and $\bar{B}$ is indicated by dashes.

Means 13 for deriving a correction signal C for aperture correction from the brightness signal Y may be formed in known manner. For obtaining horizontal aperture correction assuming that the lines are scanned horizontally, means 13 may, for example, be provided with two delay lines each having a delay time of a fraction of one line period. By adding the undelayed signal Y to the signal Y which is delayed twice, and by subtracting half the sum signal thus obtained from the signal Y which is delayed once, a correction signal for horizontal aperture correction is obtained in known manner. A correction signal for vertical aperture correction may be obtained in a similar manner with the aid of two delay lines having a delay time of at least one full line period. In connection with this long delay time and the available glass delay lines a high-frequency modulated signal Y is generally controlled by the delay lines which signal is subsequently demodulated again. It is alternatively possible to provide means 13 with one or more memory tube by means of which a correction signal for horizontal and vertical aperture correction can be obtained likewise in known manner. Since the construction of means 13 which may include oscillators, amplifiers, filters, gammacorrectors, etc. is irrelevant for the present invention, it need not be described herein. The principle of the methods of deriving a correction signal C for horizontal and/or vertical aperture correction from the signal Y is, however, very important. In fact, due to the comparative character of the correction described, the result is that changes of and variations in the scene which have been sufficiently taken over by the brightness signal Y become only little manifest in the correction signal C.

A correction signal supplied by aperture correction means is normally added for a certain extent to the picture signal which is once delayed and from which it is derived so that a so-called aperture-correction picture signal is obtained. According to the recognition of the invention the correction signal C for aperture correction derived from the brightness signal Y must, however, not be added to the brightness signal Y itself, but must be superimposed on each color signal $\bar{G}$, $\bar{R}$ and $\bar{B}$. To this end the correction signal C for aperture correction is applied to superposition stages $14_1$, $14_2$ and $14_3$ which are designed as added stages starting from the given phase of the correction signal C. The superposition picture signals $\bar{G}+C$, $\bar{R}+C$ and $\bar{B}+C$ supplied by superposition stages $14_1$, $14_2$ and $14_3$ are subsequently applied to gammacorrectors $15_1$, $15_2$ and $15_3$, respectively, so that gamma-corrected superposition picture signals $(\bar{G}+C)^{1/\varphi}$, $(\bar{R}+C)^{1/\varphi}$ and $(\bar{B}+C)^{1/\varphi}$ result. However, it is alternatively possible to perform gamma correction prior to the superposition, so that signals $\bar{G}^{1/\varphi}+C$, $\bar{R}^{1/\varphi}+C$ and $\bar{B}^{1/\varphi}+C$ are provided by the camera.

With regard to the color television camera of the YGRB-type as it is normally used, the camera according to the invention has the advantage, in addition to the advantages already mentioned, that no stringent requirements are imposed on the spectral sensitivity distribution of the light projected on the camera tube 4 and representing the brightness relative to the light which is projected on the camera tubes 1, 2 and 3. In fact, it is found from the relation $Y=0.30R+0.59G+0.11B$ with three factors that one factor too much is given by the camera provided with four camera tubes. This is avoided in the camera according to the invention in that the brightness signal Y only serves for aperture correction and is not at all combined directly with the signals $\bar{G}$, $\bar{R}$ or $\bar{B}$.

FIG. 2 shows diagrammatically a television camera according to the invention in which components already indicated in the description of FIG. 1 are denoted by the same reference numerals. The camera of FIG. 2 shows four identical camera tubes 1 through 4 which supply the picture signals $\bar{Y}$, $\bar{R}$, $\bar{B}$ and Y respectively. For reducing the previously mentioned effective capacitance of the target plates of the camera tubes 1, 2 and 3 relative to that of camera tube 4 the light coming from a scene to be picked up is applied to the camera tubes 1, 2 and 3 through the means $16_1$, $16_2$ and $16_3$ concentrating the light in a discontinuous manner. One means 16 may divide the light coming from the scene into strips separated from one another as well as dots, and may be manufactured, for example, from a glass fiber material. The result of a means 16 is that only a part and not a full surface of the target plates in tubes 1, 2 and 3 is used. As a result the surface of the target plate discharged by an electron beam 6 and proportional thereto the effective capacitance of the target plate is reduced. The result of course is that due to the discontinuous character of the potential image on target plate 7 the signal $\bar{Y}$, $\bar{R}$ and $\bar{B}$ supplied by tubes 1, 2 and 3 would show poor details when displayed on a screen of a display tube. However, according to the recognition of the invention the details are supplied by deriving the correction signal C for aperture correction from the signal Y produced by camera tube 4 and by applying it to the superposition stage $14_1$, $14_2$ and $14_3$ to which also the signals $\bar{Y}$, $\bar{R}$ and $\bar{B}$ are applied through a matrix 17. It will be evident that the current intensity and the cross section of the electron beam in the camera tubes 1, 2 and 3 in order to obtain a satisfactory positive charge neutralization must be adapted to the charge concentration which is obtained on a target plate 7 with the aid of a means 16.

For monochrome X-ray television it is possible to use a camera having two camera tubes each supplying a picture signal representing the brightness of the light from the scene. A combination of the camera tubes 1 and 4 in FIG. 2 provides a satisfactory solution of visualizing without distortion the rapid variations in the scene when the signal Y+C is displayed on a display screen. Tube 4 may then, for example, also have a target plate surface which is larger than that of tube 1, as is shown in FIG. 1 instead of the camera being provided with a means 16.

It is known that a camera for color television may include two camera tubes. One camera tube supplies, for example, a brightness signal and the other supplies, for example, three color signals. To this end the target plate of the last-mentioned camera tube is provided, for example, with indexing strips which are located transversely to the direction of scanning of an electron beam. The green, red and blue light from a scene is successively projected between the indexing strips so that the picture signal supplied by the camera tube successively provides three color signals which may be separated by indexing signals. The details of a color signal obtained in such a manner are of course poor when being displayed on the screen of the display tube. However, in combination with the brightness signal provided by the first-mentioned camera tube a reasonable satisfactory picture can be obtained in practice on the display screen of a color television receiver. All this does not alter the fact that, due to the said combination, stringent requirements regarding the spectral sensitivity distribution must be imposed upon the picture signal Y as has already been described for the YGRB-television camera including four camera tubes. It will be evident that the present invention is also applicable to a color television camera of this kind including two camera tubes for the purpose of improving the details without distortions and avoiding the said stringent requirements.

What is claimed is:

1. A circuit comprising first and second camera tubes for generating output television signals, each having a target plate of a particular effective capacitance, said first tube target plate effective capacitance being greater than said second tube target plate effective capacitance; means for deriving an aperture correction signal having an input coupled to receive said signal from said first tube, and an output; and first means for combining the output of said deriving means with said output signal from said second tube; whereby said correction signal is applied to said second tube output signal.

2. A circuit as claimed in claim 1 further comprising third and fourth television camera tubes, each having a target plate of a particular effective capacitance smaller than that of first tube target plate effective capacitance; and second and third means for combining the output of said deriving means with the signals from said third and fourth tubes respectively.

3. A circuit as claimed in claim 2 further comprising a matrix having a plurality of inputs coupled to receive the output signals from said second, third, and fourth tubes respectively, and a plurality of outputs coupled to said first, second, and third combining means respectively.

4. A circuit as claimed in claim 1 wherein said first tube target plate has a smaller thickness than that of said second tube, whereby said first tube has a greater effective target plate capacitance than that of said second tube.

5. A circuit as claimed in claim 1 further comprising means for discontinuously concentrating light upon said second tube, whereby said second tube has a smaller effective target plate capacitance than that of said first tube.

6. A circuit as claimed in claim 5 wherein said concentrating means comprises glass fibers.

7. A circuit as claimed in claim 1 wherein said deriving means comprises means for deriving an aperture correction signal in both horizontal and vertical directions.

* * * * *